(12) United States Patent
Batura et al.

(10) Patent No.: US 10,326,556 B2
(45) Date of Patent: *Jun. 18, 2019

(54) METHOD AND SYSTEM OF FREQUENCY CORRECTION IN LPWAN NETWORKS

(71) Applicant: Waviot Integrated Systems LLC, Watertown, SD (US)

(72) Inventors: Danylo Sergeevich Batura, Mytishchi (RU); Vasiliy Vasilievich Anisimov, Moscow (RU)

(73) Assignee: WAVIOT INTEGRATED SYSTEMS, LLC, Watertown, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,188

(22) Filed: Dec. 14, 2018

(65) Prior Publication Data

US 2019/0123859 A1    Apr. 25, 2019

Related U.S. Application Data

(63) Continuation-in-part of application No. 15/858,784, filed on Dec. 29, 2017.

(Continued)

(51) Int. Cl.
*H04L 1/00* (2006.01)
*H04L 1/20* (2006.01)
(Continued)

(52) U.S. Cl.
CPC ......... *H04L 1/0061* (2013.01); *H04B 17/309* (2015.01); *H04L 1/203* (2013.01); *H04W 4/80* (2018.02); *H04W 72/0453* (2013.01)

(58) Field of Classification Search
None
See application file for complete search history.

(56) References Cited

U.S. PATENT DOCUMENTS 5,668,837 A    9/1997  Dent
5,960,040 A    9/1999  Cai et al.
(Continued)

FOREIGN PATENT DOCUMENTS

CN    106341876 A    1/2017
CN    107135554 A    9/2017
(Continued)

OTHER PUBLICATIONS

Kerlink, Wirnet Station, Embedded Base Station Controller and Radio Network Controller, for remote operations, retrieved from https://www.kerlink.com/product/wirnet-station/ on Sep. 13, 2018.
(Continued)

*Primary Examiner* — Hardikkumar D Patel
(74) *Attorney, Agent, or Firm* — BCF LLP (57) ABSTRACT

There is discloses a method of frequency correction during data transmission in a low-power wide-area network (LPWAN). The method is executable by a computing device coupled to the LPWAN. The method comprises: determining an actual frequency of the received message as a mid-point of a given spectrum section, based on the given spectrum section meeting a condition of: the message was successfully received in the given spectrum section, the signal quality metric has a maximum value in the given spectrum section in comparison with all other spectrum sections where that message was also received; calculating an expected frequency of the radio signal based on data contained in the message; determining a received radio signal frequency error as a difference between the actual frequency and the expected frequency of the signal; generating a message send frequency based on the received radio signal frequency error.

13 Claims, 3 Drawing Sheets

Related U.S. Application Data (60) Provisional application No. 62/440,946, filed on Dec. 30, 2016.

(51) Int. Cl.
*H04B 17/309* (2015.01)
*H04W 4/80* (2018.01)
*H04W 72/04* (2009.01)

(56) References Cited

U.S. PATENT DOCUMENTS

| | | |
|---|---|---|
| 5,974,098 A | 10/1999 | Tsuda |
| 6,115,728 A | 9/2000 | Nakai et al. |
| 7,508,889 B2 | 3/2009 | Liu |
| 8,156,209 B1 | 4/2012 | Phadnis et al. |
| 9,049,732 B2 | 6/2015 | Fourtet et al. |
| 9,252,998 B2 | 2/2016 | Seely |
| 10,044,098 B2 | 8/2018 | Ali |
| 2003/0224725 A1 | 12/2003 | Limberg |
| 2004/0096021 A1* | 5/2004 | Koval ............... H04L 27/24 375/350 |
| 2005/0188129 A1 | 8/2005 | Abdelilah et al. |
| 2006/0094383 A1 | 5/2006 | Zylowski |
| 2006/0133827 A1 | 6/2006 | Becouarn et al. |
| 2006/0251190 A1 | 11/2006 | Wang et al. |
| 2006/0285607 A1 | 12/2006 | Strodtbeck et al. |
| 2007/0268980 A1 | 11/2007 | Brannstorm et al. |
| 2007/0280098 A1 | 12/2007 | Bhatt et al. |
| 2008/0151985 A1* | 6/2008 | Chin ............... H04L 25/02 375/231 |
| 2008/0240285 A1 | 10/2008 | Han et al. |
| 2011/0032920 A1 | 2/2011 | Suberviola |
| 2011/0289156 A1 | 11/2011 | Pimazar |
| 2012/0014488 A1 | 1/2012 | Liu |
| 2012/0051287 A1* | 3/2012 | Merlin ............... H04B 7/0617 370/328 |
| 2012/0195184 A1 | 8/2012 | Dapper et al. |
| 2013/0202068 A1* | 8/2013 | Ly-Gagnon ....... H04W 52/0225 375/343 |
| 2015/0092753 A1* | 4/2015 | Gupta ............... H04W 56/001 370/336 |
| 2016/0119184 A1 | 4/2016 | Soriaga et al. |
| 2016/0335897 A1* | 11/2016 | Naserian ............... G08G 1/161 |
| 2016/0373138 A1 | 12/2016 | Li et al. |
| 2017/0139053 A1 | 5/2017 | Vishin et al. |
| 2017/0171841 A1 | 6/2017 | Chen et al. |

FOREIGN PATENT DOCUMENTS

| | | |
|---|---|---|
| WO | 2012027880 A1 | 3/2012 |
| WO | 2017197441 A1 | 11/2017 |

OTHER PUBLICATIONS

Sigfox Wireless Ethernet Gateway, retrieved from https://partners.sigfox.com/products/sigfox-wireless-ethernet-gateway, on Sep. 13, 2018.

Device—Wireless Gecko by Silicon Labs—information retrieved from https://lwww.silabs.com/products/wireless/wireless-gecko-iot-connectivity-portfolio on Aug. 15, 2018.

Device—AX5043—Advanced High Performance ASK and FSK Narrow-band Transceiver for 27—1050 MHz Range, or Semiconductor, retrieved from https://lwww.onsemi.com/pub/Collateral/AX5043-D.PDF on Aug. 15, 2018.

Wenxu Zhang et al., "Application of FFT parallel code phase search algorithm in GNSS software" 2016 IEEE 13th International Conference on Signal Processing (ICSP). Online at https://ieeexplore.ieee.org/abstract/document/7878011/.

U.S. Appl. No. 15/858,784, filed Dec. 29, 2017.

* cited by examiner

METHOD AND SYSTEM OF FREQUENCY CORRECTION IN LPWAN NETWORKS

CROSS-REFERENCE

The present application is a continuation-in-part of U.S. patent application Ser. No. 15/858,784, filed on Dec. 29, 2017, which claims priority to U.S. Provisional Patent Application No. 62/440,946, filed on Dec. 30, 2016, the entirety of both of which is incorporated herein by reference.

FIELD OF THE TECHNOLOGY

This technical solution generally relates to the field of computer equipment in general and, in particular, to methods and systems of frequency correction during data transmission in LPWAN.

BACKGROUND OF THE TECHNOLOGY

Nowadays, when narrow-band radio signals are used in low-power wide-area network networks (LPWAN), with the signal bandwidth of 500 Hz and less, an inaccuracy in generating carrier frequency by frequency synthesizers may result in occurrence of problems associated with misalignment of the frequencies of the transmitter and the receiver. For narrow-band radio signals transmitted from a subscriber device to the hub, this problem can be resolved by processing by the hub of a wide frequency band which is a priori larger than any misalignment of the frequencies of the transmitter of the subscriber device and the receiver of the hub. In the reverse direction from the hub to the subscriber device, radio signals are as a general rule received using off-the-shelf transceivers that process a narrow signal band which corresponds to the band of the expected signal without taking into account any possible discrepancies of the frequencies of the receiver and the transmitter. In this case, the carrier frequency of the signal in the radio signal should match exactly the passband of the input reception filters of the subscriber device for the successful reception of the radio signal. For example, for signals with a 200 Hz band, the alignment accuracy should be in the order of several tens of Hz.

There known LPWAN standards, such as LoRa™ и SigFox™ standards. Devices that operate in accordance with the LoRa™ standard use signals with a spectrum extension. A drawback of that solution is a reduced spectral efficiency of the data network. To transmit messages from hubs to subscriber devices, SigFox™ uses signals with a bandwidth sufficient not to need the application of this invention. A drawback of that solution is a comparative reduction of the communication distance range during transmission from the hub to subscriber devices. Thus, the existing systems do not use a narrow-band modulation for downlink transmission of data.

U.S. Pat. No. 9,252,998 B2 entitled "Radio to detect and compensate for frequency misalignment" (patent holder: Itron Inc, publication date: Feb. 2, 2016 discloses a radio receiver which contains a radio frequency (RF) subsystem; a digital subsystem to obtain an input from the RF subsystem; a means to assess the frequency error for the obtained samples from the digital subsystem and to assess the shift of the frequency of the received signal from multiple received signals, in which case the tool for assessing the frequency error measures the frequency deviation according to the packet preamble length, and multiple received signals are associated with multiple various channel bands; as well as a transmitter to transmit data at the frequency which is based at last partially on the assessed frequency shift.

SUMMARY

This technical solution is aimed at eliminating the drawbacks inherent in the solutions known from the background.

In accordance with a first broad aspect of the present technology, there is provided a method of frequency correction during data transmission in a low-power wide-area network (LPWAN), the LPWAN including a hub communicatively coupled to an antenna, the method executable by a computing device coupled to the hub. The method comprises: receiving by the hub from the antenna, a radio signal that carries a message from a subscriber device; processing, by the computing device, the radio signal, the processing including: dividing an entire bandwidth of the hub into spectrum sections having width corresponding to a message band width; receiving, by the computing device, messages in at least some of the spectrum section; identifying, by the computing device, a number of spectrum sections where the message was received; generating, by the computing device, a signal quality metric for each received message in each spectrum section where the message was received; determining, by the computing device, an actual frequency of the received message as a mid-point of a given spectrum section, based on the given spectrum section meeting a condition of: the message was successfully received in the given spectrum section, the signal quality metric has a maximum value in the given spectrum section in comparison with all other spectrum sections where that message was also received; calculating, by the computing device, an expected frequency of the radio signal based on data contained in the message; determining, by the computing device, a received radio signal frequency error as a difference between the actual frequency and the expected frequency of the signal; generating, by the computing device, a message send frequency based on the received radio signal frequency error.

In some implementations of the method, the method further comprising: executing a hub frequency error correction by: transmitting, by a transmitter of the hub, at least one additional message at a frequency known by the hub and available for reception by the hub; generating a hub frequency error as a difference between the actual frequency and the an expected frequency of the at least one additional message; and wherein the generating the message send frequency is further based on the received radio signal frequency error and the hub frequency error.

In some implementations of the method, the spectrum sections overlap.

In some implementations of the method, the receiving, by the computing device, messages in at least some spectrum sections comprises receiving messages independently in the at least some spectrum sections.

In some implementations of the method, the generating, by the computing device, the signal quality metric for a given received message in each spectrum section where the message was received: decoding the given received message; using an entirety of the decoded given received message to generate the signal quality metric.

In some implementations of the method, the signal quality metric is further based on at least one of: (i) an average signal power and (ii) an average signal/noise ratio.

In some implementations of the method, the calculating, by the computing device, the expected frequency of the radio signal is further based on a transmitted messages counter contained in the message, wherein the transmitted messages counter is identified in a table.

In some implementations of the method, a transmission device of the hub is located within the hub.

In some implementations of the method, a transmission device of the hub is executed as one of: an integrated circuit and an assembly of separate components.

In accordance with another broad aspect of the present technology, there is provided a system of frequency correction during data transmission in LPWAN. The system comprises: a reception device antenna configured to direct a received signal from a transmission device to a hub; the hub being configured to receive the radio signal from the reception device antenna; a computing device associated with the hub, the computing device being configured to: receive by the hub from the reception device antenna, a radio signal that carries a message; process, by the computing device, the radio signal, the processing including: dividing an entire bandwidth of the hub into spectrum sections having width corresponding to a message band width; receive, by the computing device, messages in at least some of the spectrum section; identify, by the computing device, a number of spectrum sections where the message was received; generate, by the computing device, a signal quality metric for each received message in each spectrum section where the message was received; determine, by the computing device, a frequency of the received message as a mid-point of a given spectrum section, based on the given spectrum section meeting a condition of: the message was successfully received in the given spectrum section, the signal quality metric has a maximum value in the given spectrum section in comparison with all other spectrum sections where that message was also received; calculate, by the computing device, an expected frequency of the radio signal based on data contained in the message; determine, by the computing device, a received radio signal frequency error as a difference between the determined and expected frequencies of the signal; generate, by the computing device, a message send frequency based on the received radio signal frequency error.

In some implementations of the system, a transmission device of the hub is located within the hub.

In some implementations of the system, a transmission device of the hub is implemented as one of: (i) an integrated circuit and (ii) an assembly of separate components.

In some implementations of the system, the hub further comprises a reception device and a transmission device.

Non-limiting embodiments of the present technology are directed to methods and systems that can be used in building the NB-Fi LPWAN communication technology. Products that use this technical solution can be manufactured for the Internet of Things (IOT) market.

Non-limiting embodiments of the present technology have been developed based on inventors' appreciation of at least one problem associated with the prior art solutions. Without wishing to be bound y specific theory, the prior art does not appear to teach how technically a frequency error is assessed, nor does it show how a frequency error on the reception device is connected with the needed compensation on transmission.

Non-limiting embodiments of the present technology are directed to a compensation algorithm for the instability of the frequencies of the master generators of the subscriber device and the hub. The non-limiting embodiments of the present technology can be used to ensure a sufficiently low level of misalignment of carrier frequencies during the transmission of messages from the hub to subscriber devices.

The technical task or the technical problem resolved in this technical solution is to determine the value of the necessary correction of the carrier frequency of a message during transmission from the hub to subscriber devices.

The technical result achieved in resolving the above-mentioned technical task, in at least some non-limiting embodiments of the present technology, is to improve the accuracy of assessing the frequency error on the hub by using the method in which the frequency error is assessed after receiving the message and correcting the errors as well as compensating for interferences and making the transmission from the hub to subscriber devices at an updated frequency. This allows, in at least some non-limiting embodiments of the present technology, for using narrow-band signals during transmission from the hub to subscriber devices.

Additionally, in at least some non-limiting embodiments of the present technology, the interference resistance of data transmission from the hub to subscriber devices is improved, the distance range is increased and the spectral efficiency is enhanced due to data transmission at a lower speed with a narrower signal band as well as due to a more accurate alignment of the band of the transmission device with the band of the receiver on the subscriber device.

The stability of assessing the frequency vs. interferences that look spectrally similar to the expected signal from the subscriber device is also improved, in at least some non-limiting embodiments of the present technology.

This technical solution also allows, in at least some non-limiting embodiments of the present technology, for implementing the transmitter and receiver of the hub separately, using separate and, in some versions, different reference clocks and RF frequency synthesizers. This allows for dividing the design of the hub into several parts or dividing units inside one part according to their functional purpose as well as carrying out the reception and transmission at varying frequencies.

The technical result is achieved, in at least some non-limiting embodiments of the present technology, by implementing the method of assessment of the frequency error upon reception, recalculating that error into the necessary adjustment for transmission and transmitting the data with the adjustment.

The technical result is on the whole achieved, in at least some non-limiting embodiments of the present technology, by implementing the method of frequency correction during data transmission in LPWAN networks, the method including the steps of:

a radio signal is received from the antenna by the hub;
the received radio signal is then processed by the computing device of the hub, in which case the whole bandwidth of the hub is divided into sections corresponding to the message band by their width (spectrum sections);
then messages are received using the computing device of the hub in each section allocated in the previous step;
after that, the numbers of the spectrum sections where the message was received are memorized for each message received in the previous step;
then signal quality metrics are generated using the computing device of the hub for each received message in each spectrum section where the message was received;
the frequency of the received message is determined as the mid-point of the spectrum section where the following conditions are met: the message was received successfully in that section, and the signal quality metric takes the maximum value in that section in comparison with all the sections where that message was also received;

then the expected frequency of the radio signal is calculated on the basis of the data contained in the message;

the received radio signal frequency error is determined as a difference between the determined and expected frequencies of the signal;

the message send frequency is generated on the basis of the previously determined error of the frequency of the received radio signal.

In some versions of implementation of the technical solution, the hub frequency error is additionally corrected as follows:

at least one message is transmitted using the hub's transmitter at the frequency known by the hub and available for reception by the hub;

the frequency of that message is determined similarly to the procedure described above, splitting the hub band into spectrum sections and comparing the signal quality metric for the sections where the message is received;

the hub frequency error is determined as a difference between the signal frequency determined in the previous step and the expected frequency of the signal which is sent from the transmission part of the hub and received on its receiver;

the message send frequency is generated on the basis of the received message frequency error and the hub frequency error determined earlier.

In some versions of implementation of the technical solution, when the bandwidth is split into sections, such sections overlap.

In some versions of implementation of the technical solution, the hub receives messages in each section independently of each other.

In some versions of implementation of the technical solution, the whole message after decoding is used to generate a signal quality metric.

In some versions of implementation of the technical solution, the average signal power and/or the average signal/noise ratio is the signal quality metric.

In some versions of implementation of the technical solution, the calculation of the expected frequency is connected with the transmitted messages counter which is contained in the message, using a table.

In some versions of implementation of the technical solution, the transmitter of the hub is located within the hub.

In some versions of implementation of the technical solution, the transmitter of the hub is a separate device.

In some versions of implementation of the technical solution, the transmitter of the hub is made as an integrated micro-circuit or assembled of separate components.

BRIEF DESCRIPTION OF THE DRAWINGS

The construction and advantages of the non-limiting embodiments of the present technical solution will become clear from the detailed description given below and with the enclosed drawings where.

DETAILED DESCRIPTION OF THE NON-LIMITING EMBODIMENTS

The non-limiting embodiments of the present technical solution can be implemented as a component of a distributed computer system (whether or not centralized), the components of which distributed computer system can be cloud-based or local servers, metering instruments, routers, etc., without being so limited.

In accordance with the non-limiting embodiments of the present technology, the term "system" can include one or more of: a computer system or an automated system (AS), a computer, a numerical control system, a PLC (programmable logical controller), a computerized control system and any other devices capable of executing a preset, clearly defined sequence of computing operations (actions, instructions).

In accordance with the non-limiting embodiments of the present technology, the term "message" includes a block of data of ten bytes or more, the format of which is known to both a subscriber device and a hub and the content of which allows the message to be detected and received by the receiver (be it subscriber device or the hub).

The message contains a pre-determined sequence of bits called a "preamble", which is used for the initial search for the message in the input signal and the data of the message itself. In some non-limiting embodiments of the present technology, the message also contains additional service information, for example a transmitted messages counter or the like. In some non-limiting embodiments of the present technology, the message can further include a checksum, a cyclic redundancy code or another set of additional data. This type of additional information can be used to control the correctness of reception of the message. In some non-limiting embodiments of the present technology, the message can also contain additional forward error correction overhead.

In some non-limiting embodiments of the present technology, the term "hub" means a network infrastructure device, which is configured to serve a group of subscriber devices. In some non-limiting embodiments of the present technology, the hub comprises a receiver, a transmitter, a computing device and, in some non-limiting embodiments of the present technology, other devices (e.g. antennas, power supply system, etc.).

In some non-limiting embodiments of the present technology, a computing device mean a device configured to make calculations on the basis of a pre-installed program. As an example, the computing device can be a personal computer or a specialized computer, such as a system-on-a-chip, a field-programmable gate array, etc.

In some non-limiting embodiments of the present technology, a subscriber device is a radio station which exchanges data with the hub.

In some non-limiting embodiments of the present technology, a receiver (sometimes referred to as a receiver device) is a device designed (in combination with an antenna) for receiving radio signals or natural radio emissions and converting them into the form allowing for using the information contained in them.

In some non-limiting embodiments of the present technology, a transmitter (sometimes also referred to as a radio transmitter or a radio transmission device) is an electronic device for generation of a radio frequency signal to be emitted. The transmission device is configured to generate (by itself) radio frequency alternating current, which is supplied through the feeder to the transmission antenna which, in term, emits radio waves.

In some non-limiting embodiments of the present technology, messages are transmitted in both directions at frequencies that can be unambiguously determined by the data contained in the message packet in the event where the transmission frequency is selected by the transmission device, or at the frequencies known by the transmitter and receiver in advance. In at least some non-limiting embodiments of the present technology, the transmitted messages have a transmitted messages counter, which in a form of a table is associated with the frequency.

Message transmission frequencies are determined by the subscriber device 210. This can be due to the fact that the hub 220 is configured to receive messages in the entire band used by the communication system and a particular method of determination the frequency is not important for reception on the hub 220 and further processing. On the other hand, the subscriber device 210 is configured to receive messages only at one, pre-selected frequency. The architecture of the system for frequency correction during data transmission in LPWAN networks is shown in detail in FIG. 2.

Figure 1:
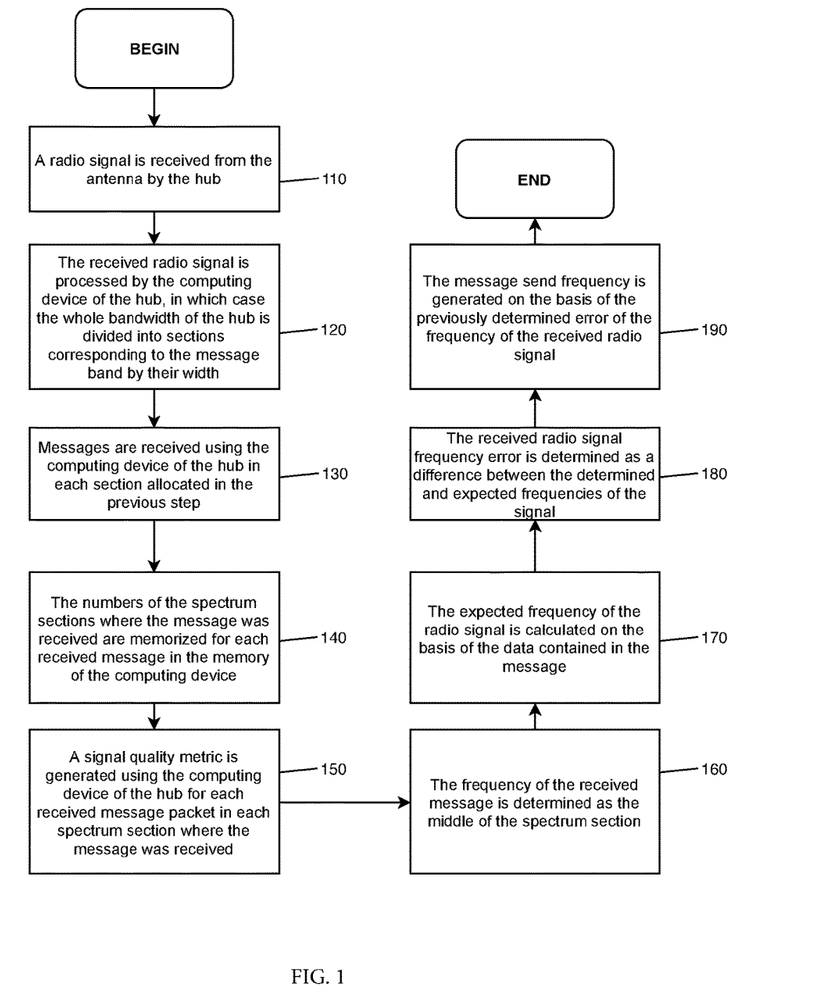
FIG. 1 depicts a flow chart of a non-limiting embodiment of a method of frequency correction during data transmission in LPWAN networks.

As depicted in FIG. 1, the method in accordance with the non-limiting embodiments of the present technology is based on the premise there is a capability to measure the frequency of received signals on the hub input.

Step 110: a radio signal is received from the antenna by the hub.

Figure 2:
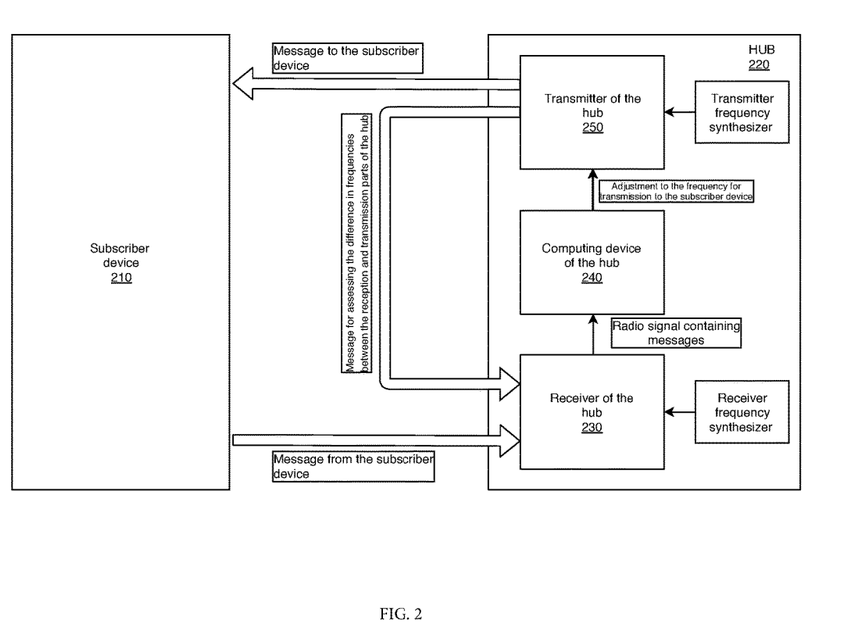
FIG. 2 depicts a non-limiting embodiment of a system for frequency correction during data transmission in LPWAN networks.

At step 110, a receiver 230 of a hub 220 receives at least one radio signal carrying a message from the antenna and the frequency of that received signal is determined as follows.

Step 120: the received radio signal is processed using the computing device of the hub, in which case the whole bandwidth of the hub is divided into sections corresponding to the message band by their width.

Figure 3:
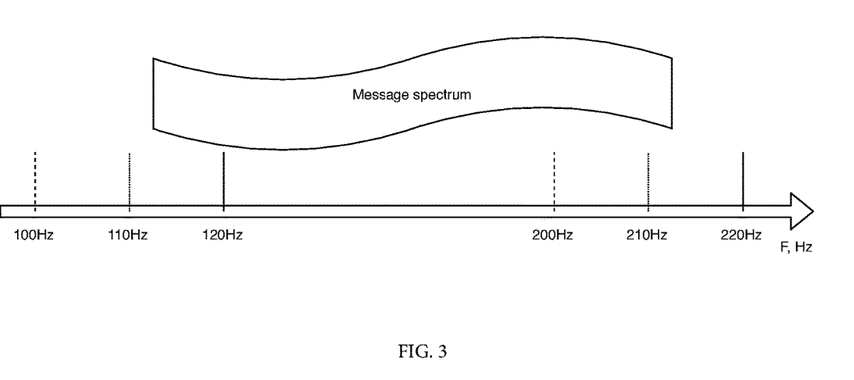
FIG. 3 depicts a non-limiting embodiment of a computing device divides the entire bandwidth into sections corresponding to a message band by their width.

At step 120, a computing device 240 of the hub 220 processes the frequency band in which messages can be transmitted. The computing device 240 of the hub 220 divides the whole band into sections corresponding to the message band by their width, as shown in FIG. 3. The method of locating the sections in relation to each other is not particularly limited. In some non-limiting embodiments of the present technology, the sections can overlap.

For example, in accordance with at least some non-limiting embodiments of the present technology, the total analyzed band on reception can be 50000 Hz, in which case bandwidth sections can be 100 Hz with a 25 Hz increment. That is, 0-100 Hz, 25-125 Hz and so on. It can be seen in this particular example that the bands overlap, but this does not need to be so in each every non-limiting embodiment of the present technology.

Step 130: messages are received using the computing device of the hub in each section allocated at step 120.

After this pre-processing is completed, at step 120, the hub 220 receives messages in each section of the bandwidth of the hub 220. In some non-limiting embodiments of the present technology, the receiving at step 130 can be executed independently.

Step 140: the numbers of the spectrum sections where the message was received are stored for each received message in the memory of the computing device.

At step 140, a message can be received in several input band sections which are even outside the band of the radio signal which carries the message due to distortions in the radio channel and the imperfection of the receiver itself. Just as example this situation may occur due to the existence of inter-modulation distortions or due to tolerances resulting from the use of simplified computational methods and fixed point calculations.

For example, a message with a 100 Hz band can be received in several neighboring overlapping sections of the input band. For example, in sections 100-200 Hz, 110-210 Hz, 120-220 Hz. It can be seen that these sections overlap and, if the message is transmitted in the 110-210 Hz section, it can also be received in the overlapping sections, depending on the reception algorithms used. If the power is sufficient, the message can also be received in other spectrum sections, for example, due to distortions in case of an overload of the input path of the reception device.

Step 150: a signal quality metric is generated using the computing device of the hub for each received message in each spectrum section where the message was received.

The hub 220 generates a signal quality metric for each received message according to a pre-selected rule. The whole message, rather than only pilot characters can be used to generate that metric because the message is known as a whole after the successful reception.

In non-limiting embodiments of the present technology, the average signal power or the average signal/noise ratio can be used as a signal quality metric. As an example, the signal/noise ratio can be within 0 to 30 dB. For these metrics, the best value will be the maximum value.

Step 160: the frequency of the received message is determined as the mid-point of the spectrum section.

After the metrics are generated, the computing device 240 of the hub 220 selects, as part of step 160, the mid-point of the spectrum section in which the message was successfully received and the associated metric achieves the best value as the frequency of the message.

The selected spectrum section is done, for example, based on the following conditions being met:
the message was successfully received in that section,
the signal quality metric takes the maximum value in that section in comparison with all the sections where that message was also received.

For example, a message can be received in the 200-300 Hz channel, in which case the assessment of the signal/noise ratio for the received signal can be 10 dB. As another example, a message can be received in the 225-325 Hz channel, in which case the assessment of the signal/noise ratio can be 15 dB. In this case, the 225-325 Hz channel and the 275 Hz frequency will be selected, i.e. the mid-point of that channel, will be considered as the determined reception frequency.

In at least some non-limiting embodiments of the present technology, the methods of the present technology can be summarized as follows:
use of the entire message, which has passed processing and decoding, for assessing the metric;
consideration of only those spectrum sections where the message was successfully received rather than those where there can be a strong interference.

Step 170: the expected frequency of the received message is calculated on the basis of the data contained in the message.

In some non-limiting embodiments of the present technology, the expected message frequency is fixed (i.e. pre-determined) for all messages from a given subscriber device 210 and is known in advance. In other non-limiting embodiments of the present technology, the expected message frequency is determined according to a table on the basis of the transmitted messages counter which is transmitted in the message itself. In other non-limiting embodiments of the present technology, the message frequency is determined according to a formula known in advance by the hub 220 and the subscriber device 210 or according to the table, depending on the data transmitted in the message, for example, using the calculation of the message checksum and comparing one of the checksum bytes and the frequency according to the table known in advance.

Step 180: the received radio signal frequency error is determined as a difference between the determined and expected frequencies of the signal.

As part of step 180, the hub 220 determines an error between the signal frequency having been determined on the hub 220 and the expected signal frequency (which is calculated on the basis of the message packet) is determined according to the following formula:

$$\Delta f_{ul\_rx} = f_{exp\_ul} - f_{rx\_ul}, \qquad \text{Formula 1}$$

where $\Delta f_{ul\_rx}$ is the difference between the expected frequency of the message of the subscriber device 210 and the frequency at which the message was received, $f_{exp\_ul}$ is the expected message frequency, and $f_{rx\_ul}$ is the frequency of the message received by the hub 220, as determined in the manner described above.

The composition of this error includes both the offset of the transmitter of the subscriber device 210 and the error of metering the frequency by the hub 220.

Where $\Delta f_{user}$ is the absolute offset of the frequency of the subscriber device, and $\Delta f_{bs\_rx}$ is the absolute offset of the frequency of the receiver 230 of the hub 220.

The error of the generator of the transmitter 250 of the hub 220 in relation to its receiver 230 is also assessed. In this case, the transmitter 250 can be located on another device, within the hub 220 or remotely relative to the hub 220. The assessment of that error allows for additionally compensating for the error of the frequency synthesizer of the receiver of the hub in relation to the frequency synthesizer of the transmitter of the hub. In particular, it allows for using different generators for the receiver 230 of the hub and the transmitter 250 of the hub.

The transmitter 250 of the hub 220 can be implemented as an integrated circuit or assembled of components. For example, the transmitter 250 can be an AX5043 transceiver in specific non-limiting embodiments of the present technology. It should be noted that any other alternative device, which is configured to send messages at certain intervals (each 5 minutes, without any limitation), and which is configured to send packets at a fixed frequency $f_{exp\_tx}$ can be used as a transmission device. The frequency of the messages designed for assessing the error of the frequency synthesizer of the transmitter 250 of the hub 220 in relation to its receiver 230, which is known by the hub in advance 220, is within the frequency range in which the subscriber devices 210 transmit data. For example, 864-865 MHz or 868.7-869.2 MHz frequency ranges can be used in Russia. These packets are received by the reception part 230 of the same hub 220 and the second frequency error is calculated according to the following formula:

$$\Delta f_{tx\_rx} = f_{exp\_tx} - f_{rx\_tr}, \qquad \text{Formula 2}$$

where $\Delta f_{tx\_rx}$ is the difference between the expected frequency of the message sent by the transmission device of the hub 220 and the determined frequency at which the message was received, $f_{exp\_tx}$ is the known frequency of the message sent by the transmission device of the hub 220, and $f_{rx\_tx}$ is the frequency of the message received by the hub 220 and sent by the transmission part 250 of the same hub 220, which is determined in the manner described above.

The calculation of this adjustment allows it to be used subsequently to compensate for the discrepancy in the frequencies between the receiver and transmitter of the hub.

The composition of this error includes both the tolerance of the transmitter of the hub 220 and the error of measuring the frequency by the hub 220:

$$\Delta f_{tx\_rx} = \Delta f_{tx} - \Delta f_{bs\_rx}, \qquad \text{Formula 3}$$

where $\Delta f_{tx}$ is the absolute offset of the frequency of the transmission part 250 of the hub, and $\Delta f_{bs\_rx}$ is the absolute offset of the frequency of the reception part 230 of the hub.

Step 190: the message send frequency is generated on the basis of the received radio signal frequency error determined earlier.

The message send frequency is determined according to the following formula:

$$\begin{aligned} f_{tx\_user} &= f_{exp\_tx\_user} + \frac{f_{exp\_tx\_user}}{f_{exp\_tx}} (\Delta f_{ul\_rx} - \Delta f_{tx\_rx}) & \text{Formula 4}\\ &= f_{exp\_tx\_user} + \frac{f_{exp\_tx\_user}}{f_{exp\_tx}} (\Delta f_{user} - \Delta f_{bs\_rx} - \\ &\quad (\Delta f_{tx} - \Delta f_{bs\_rx})) \\ &= f_{exp\_tx\_user} + \frac{f_{exp\_tx\_user}}{f_{exp\_tx}} (\Delta f_{user} - \Delta f_{tx}). \end{aligned}$$

When the message is sent, the transmission device adds to that frequency its own error which, as can be seen above, will be compensated by adding the adjustment calculated using the two assessed frequency setting errors.

The frequency so calculated corresponds exactly to the real frequency to which the reception device of the subscriber device 210 is set, taking into account its offset.

Provided that the frequencies of transmission from the subscriber devices 210 to the hub 220 and back are equal, that is:

$$f_{exp\_tx\_user} = f_{exp\_tx} \qquad \text{Formula 5}$$

The formula of the message send frequency can be written as $f_{exp\_tx} = f_{exp\_dl} + df_1 - df_2$.

The subscriber device 210 receives the transmitted message because its frequency matches the expected one.

In one of the non-limiting embodiments of the present technology, radio frequency reception devices and transmission devices can be made at least on one semiconductor chip. Such micro-circuits fulfill various private functions of radio frequency conversions of the signal: amplification, attenuation, modification of the central frequency, etc.

In another non-limiting embodiments of the present technology, each radio frequency receiver can be made on one semiconductor integrated circuit as well as each radio frequency transmission device can be made on one semiconductor integrated chip. In this case, integrated circuits which a higher degree of integration are used, so that all the necessary functions of the reception and transmission device are fulfilled by one integrated circuit only (except for simple necessary external elements and the reference clock).

The components of the non-limiting embodiments of the present technology can be implemented using electronic components used to create digital integrated circuits, which is obvious for an expert in this art and is not expressly described because this implementation is basic and commonly usable everywhere in many technical solutions.

Micro-circuits whose operation logic is defined upon manufacturing or whose operation logic is set by programming can be used to implement the units. Programmers and debugging environments are used for programming, allowing for setting the desired structure of the digital device as a principal electric circuit or a program in special hardware description languages: Verilog, VHDL, AHDL, and others.

Some parts of the description of the non-limiting embodiments of the present technology are presented as algorithms and symbolic presentation of operations with data bits in the memory of the technical solution. Such descriptions and presentations of the algorithms are means used by data processing experts to convey the essence of the technical solution to other experts in this area as efficiently as possible. In this document and on the whole, an algorithm means a sequence of computational operations leading to the required result. Operations require physical manipulations of physical values. Usually, although not mandatorily, these values take the shape of electric or magnetic signals that can be stored, transmitted, combined, compared and otherwise manipulated.

It should however be kept in mind that all these terms should be linked to respective physical values and that they are just convenient names applicable to those values. Unless otherwise specifically and unambiguously indicated in the claims, it should be taken that throughout the text the terms, such as "determination", "computation", "calculation", "reception", "setting", "modification", etc. relate to actions and processes of a computing device, for example, a system-on-a-chip, or a similar electronic computing device which handles data and converts data presented as physical (for example, electronic) values in the registers and memory of the computing device into other data similarly presented as physical values in the memory or registers of the computing device, or other similar data storage, transmission or display devices.

The non-limiting embodiments of the present technology can be other in other particular forms, within the structures, methods or other material characteristics of the non-limiting embodiments of the present technology in accordance with the details description given in this document and the following claims of the non-limiting embodiments of the present technology. The described non-limiting embodiments of the present technology should be considered in all respect only as illustrative and non-restrictive. Thus, the scope of the legal protection of the non-limiting embodiments of the present technology is determined in the independent paragraphs of the enclosed claims of the invention rather than by the previous description.

The invention claimed is:

1. A method of frequency correction during data transmission in a low-power wide-area network (LPWAN), the LPWAN including a hub communicatively coupled to an antenna, the method executable by a computing device coupled to the hub, the method comprising:
   receiving by the hub from the antenna, a radio signal that carries a message from a subscriber device;
   processing, by the computing device, the radio signal, the processing including:
   dividing an entire bandwidth of the hub into spectrum sections having width corresponding to a message bandwidth;
   receiving, by the computing device, messages in at least some of the spectrum section;
   identifying, by the computing device, a number of spectrum sections where the message was received;
   generating, by the computing device, a signal quality metric for each received message in each spectrum section where the message was received;
   determining, by the computing device, an actual frequency of the received message as a mid-point of a given spectrum section, based on the given spectrum section meeting a condition of:
      the message was successfully received in the given spectrum section,
      the signal quality metric has a maximum value in the given spectrum section in comparison with all other spectrum sections where that message was also received;
   calculating, by the computing device, an expected frequency of the radio signal based on data contained in the message;
   determining, by the computing device, a received radio signal frequency error as a difference between the actual frequency and the expected frequency of the radio signal;
   generating, by the computing device, a message send frequency based on the received radio signal frequency error.

2. The method according to claim 1, the method further comprising:
   executing a hub frequency error correction by:
      transmitting, by a transmitter of the hub, at least one additional message at a frequency known by the hub and available for reception by the hub;
      generating a hub frequency error as a difference between the actual frequency and the an expected frequency of the at least one additional message; and
      wherein the generating the message send frequency is further based on the received radio signal frequency error and the hub frequency error.

3. The method of claim 1, wherein spectrum sections overlap.

4. The method of claim 1, wherein the receiving, by the computing device, messages in at least some spectrum sections comprises receiving messages independently in the at least some spectrum sections.

5. The method of claim 1, wherein the generating, by the computing device, the signal quality metric for a given received message in each spectrum section where the message was received includes:
   decoding the given received message; and
   using an entirety of the decoded given received message to generate the signal quality metric.

6. The method of claim 1, wherein the signal quality metric is further based on at least one of: (i) an average signal power and (ii) an average signal/noise ratio.

7. The method of claim 1, wherein the calculating, by the computing device, the expected frequency of the radio signal is further based on a transmitted messages counter contained in the message, wherein the transmitted messages counter is identified in a table.

8. The method of claim 1, wherein a transmission device of the hub is located within the hub.

9. The method of claim 1, wherein a transmission device of the hub is executed as one of: an integrated circuit and an assembly of separate components.

10. A system of frequency correction during data transmission in low-power wide-area network (LPWAN), the system comprising:
   a reception device antenna configured to direct a received signal from a transmission device to a hub;

the hub being configured to receive a radio signal from the reception device antenna;

a computing device associated with the hub, the computing device being configured to:

receive by the hub from the reception device antenna, the radio signal that carries a message;

process, by the computing device, the radio signal, the processing including:

dividing an entire bandwidth of the hub into spectrum sections having width corresponding to a message bandwidth;

receive, by the computing device, messages in at least some of the spectrum section;

identify, by the computing device, a number of spectrum sections where the message was received;

generate, by the computing device, a signal quality metric for each received message in each spectrum section where the message was received;

determine, by the computing device, a frequency of the received message as a mid-point of a given spectrum section, based on the given spectrum section meeting a condition of:

the message was successfully received in the given spectrum section, the signal quality metric has a maximum value in the given spectrum section in comparison with all other spectrum sections where that message was also received;

calculate, by the computing device, an expected frequency of the radio signal based on data contained in the message;

determine, by the computing device, a received radio signal frequency error as a difference between the determined and expected frequencies of the radio signal;

generate, by the computing device, a message send frequency based on the received radio signal frequency error.

11. The system of claim 10, wherein a transmission device of the hub is located within the hub.

12. The system of claim 10, wherein a transmission device of the hub is implemented as one of: (i) an integrated circuit and (ii) an assembly of separate components.

13. The system of claim 10, wherein the hub further comprises a reception device and a transmission device.

* * * * *